(12) United States Patent
Hicks

(10) Patent No.: US 8,757,700 B2
(45) Date of Patent: Jun. 24, 2014

(54) GROUND VEHICLE WING

(76) Inventor: Stewart Hicks, Lubbock, TX (US)

( * ) Notice: Subject to any disclaimer, the term of this patent is extended or adjusted under 35 U.S.C. 154(b) by 207 days.

(21) Appl. No.: 13/179,293

(22) Filed: Jul. 8, 2011

(65) Prior Publication Data

US 2012/0007388 A1  Jan. 12, 2012

Related U.S. Application Data

(60) Provisional application No. 61/362,934, filed on Jul. 9, 2010.

(51) Int. Cl.
*B62D 35/00* (2006.01)

(52) U.S. Cl.
USPC ...................................... 296/180.1

(58) Field of Classification Search
USPC .......... 296/180.1–180.3, 180.5, 50; 180/903; 244/213, 130, 216
See application file for complete search history.

(56) References Cited

U.S. PATENT DOCUMENTS

| | | | | |
|---|---|---|---|---|
| 3,328,074 A | * | 6/1967 | Van Rossem | 296/180.1 |
| 3,514,023 A | * | 5/1970 | Brooks et al. | 224/316 |
| 3,596,974 A | * | 8/1971 | Adams | 296/180.2 |
| 4,441,753 A | | 4/1984 | Mason | |
| 4,470,628 A | * | 9/1984 | Husted | 296/180.3 |
| 4,474,401 A | | 10/1984 | Amick | |
| 4,684,048 A | * | 8/1987 | Bott | 224/326 |
| 4,779,915 A | * | 10/1988 | Straight | 296/180.3 |
| 4,972,983 A | * | 11/1990 | Bott | 224/326 |
| 5,094,502 A | * | 3/1992 | Mote | 296/180.1 |
| 5,129,699 A | | 7/1992 | DeAngeli | |
| 5,538,316 A | * | 7/1996 | Bartholomew | 296/180.5 |
| 5,595,419 A | * | 1/1997 | Spears | 296/180.2 |
| 6,183,041 B1 | * | 2/2001 | Wilson | 296/180.1 |
| 6,328,369 B1 | * | 12/2001 | Nagai | 296/95.1 |
| 6,338,524 B1 | * | 1/2002 | Wu | 296/180.1 |
| 7,770,962 B1 | | 8/2010 | Maxwell | |
| 2010/0090497 A1 | | 4/2010 | Beckon | |

* cited by examiner

*Primary Examiner* — Glenn Dayoan
*Assistant Examiner* — Sunsurraye Westbrook
(74) *Attorney, Agent, or Firm* — Susanne M Moore

(57) ABSTRACT

A method and apparatus for improving a ground vehicle's fuel economy.

14 Claims, 3 Drawing Sheets

GROUND VEHICLE WING

CROSS REFERENCE TO RELATED APPLICATIONS

This application claims the benefit of provisional patent application 61/362,934 filed Jul. 9, 2010 by the present inventor and the application is hereto incorporated by reference in its entirety.

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE INVENTION

1. Field of the Invention

The disclosed invention relates to energy conserving vehicle accessories, namely to a method and apparatus for increasing a ground vehicle's fuel efficiency, without compromising the vehicle's safety and handling.

2. Description of Related Art

The ever increasing demand for fossil fuels has concomitantly spurred innovations for reducing energy use. With regard to ground vehicles, the technology to reduce fuel demand has historically centered on improving vehicle aerodynamics and seeking alternative fuel sources, such as electric energy, biodiesel and ethanol. The technology for improving vehicle aerodynamics has, for the most part, concentrated on reducing drag on the vehicle by streamlining the vehicle's design so that it cuts through the wind with less effort. Cutting through the wind with less effort, in turn, translates into greater fuel economy.

Methods for streamlining the vehicle's design include rounded corners, decreased height, smooth surfaces, and the avoidance of protruding parts.

Conversely, in the world of vehicle racing, objects may be added to the vehicle to, in a limited sense, increase drag or to generate down force. Racing vehicles are streamlined as described above. Such a design, however, combined with high performance engines, causes these vehicles to achieve such high rates of speed that stability becomes an issue, especially when cornering. The vehicles face the possibility of becoming temporarily airborne when encountering bumps or turns.

To counter this unwanted result, spoilers, airfoils or wings (inverted or reversed) are often added to racing and performance vehicles. The down force created by the spoiler or reversed wing enables the drive wheels to maintain traction when cornering at high speeds.

There are a substantial number of aftermarket accessories marketed as improving fuel efficiency, including computer chips, air filters, fuel additives and devices. There is a substantial body of patents and literature describing the use of wings, air foils, spoilers and turbulence modifiers attached to a ground vehicle in order to achieve various effects; however none describe using a specially designed wing to safely create controlled lift on a ground vehicle in order to decrease fuel consumption.

Although technology is improving for new model and alternative energy vehicles, the majority of vehicles on the road are still highly inefficient, some burning as much as a gallon of fuel to travel even seven or eight miles. To counter the ever snowballing energy demand compounded by increasing population, steps must be taken to make not only newly manufactured, but also the millions of existing vehicles on the road more fuel efficient, in turn saving consumers money and reducing environmental impact from fossil fuels.

A device to enable existing and future vehicles to increase fuel efficiency must be relatively easy for the consumer to install or have installed, reasonably priced in relation to the fuel expense that will be saved, and safe to use.

Notation and Nomenclature

Certain terms are used throughout the following description to refer to particular method components. As one skilled in the art will appreciate, design and manufacturing companies may refer to a component by different names. This document does not intend to distinguish between components that differ in name but not function.

In the following discussion, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

SUMMARY OF THE INVENTION

The problems associated with overconsumption of fuel by vehicles are solved by a method and apparatus for improving a ground vehicle's fuel efficiency.

It is an objective of the disclosed invention to safely improve a ground vehicle's fuel efficiency.

It is an objective of the disclosed invention to provide a method whereby owners of existing vehicles can purchase an aftermarket or retrofit device to improve the vehicle's fuel efficiency.

It is an objective of the disclosed invention to provide a method and apparatus for improving a ground vehicle's fuel efficiency that is relatively easy and inexpensive to install and use.

It is an objective of the disclosed invention to achieve enough controlled lift on a vehicle to increase its fuel efficiency without affecting the vehicle's safety and stability.

It is an objective of the disclosed invention to provide a method and apparatus that can be incorporated into new vehicle manufacturing to improve a ground vehicle's fuel efficiency.

The disclosed method and device dramatically improves a ground vehicle's fuel efficiency and is easy to use, relatively inexpensive and safe.

BRIEF DESCRIPTION OF THE DRAWINGS

The drawings contained herein represent preferred embodiments of the invention and are not intended to limit the scope. For a detailed description of various embodiments, reference will now be made to the accompanying illustrative drawings in which.

DETAILED DESCRIPTION OF THE PREFERRED EMBODIMENTS

The disclosed method and apparatus is described as follows with respect to at least one embodiment. The described method and apparatus comprises a wing supported over the central portion of the roof of a ground vehicle in order to create a significant enough amount of lift such that the vehicle's energy demand during propulsion is meaningfully reduced, without, however, creating so much lift that safety and stability are impacted.

The disclosed shape, size and mode of use creates lift on the vehicle without stalling the airflow. The lift created causes the vehicle to be actually lighter which in turn reduces the amount of fuel required to travel. The amount of lift created must be significant enough to improve fuel economy yet, at the same time, minimal enough to avoid adverse affects to vehicle stability and handling.

The slope, shape and angle of attack specific to the wing all play important roles in ensuring that the amount of lift created, as well as the effect of decreasing drag, is sufficient to create meaningful impact on fuel usage without adversely affect the stability or handling of the vehicle.

The current technology surrounding aerodynamics focuses on making the vehicle cut through the air more smoothly, reducing drag which, in turn, reduces the amount of fuel consumed during propulsion. Although aerodynamics is helpful, the disclosed method and apparatus creates dramatic improvements in fuel economy by utilizing additional scientific principles.

Figure 1:
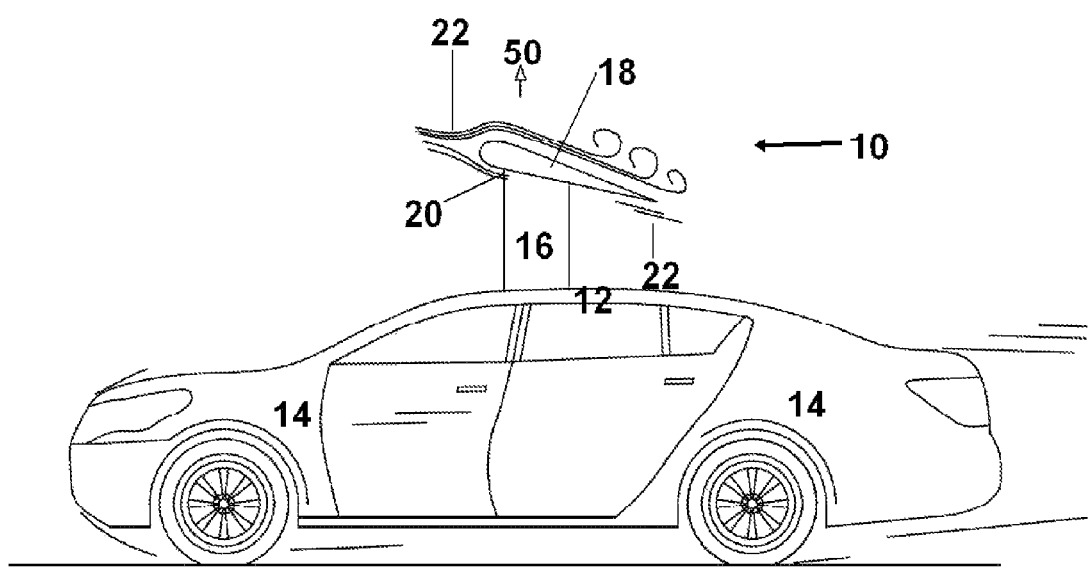
FIG. 1 depicts a side view of the wing in place on the roof of the ground vehicle, showing the wind movement around the wing.

Turning to the figures, FIG. 1 depicts a preferred embodiment of the disclosed device 10 on the occupant roof 12 of a vehicle 14. The depicted device reveals side legs 16 for fixably mounting or securing to the wing and to the occupant roof 12 of the vehicle 14 such that the wing 18 component is supported in a raised position above the roof 12. The side legs 16 pictured are one solid support on each side of the wing 18 although other designs may achieve the desired purpose as well. The wing 18 is affixed to the side legs 16 such that the wing 18, in the preferred embodiment, has an anterior twelve degree angle 20 of attack. Above and below the wing 18 are drawn lines demonstrating the air flow 22 as it strikes the wing 18 and envelopes it. Much in the way that a traditional airplane wing functions, the device 10 causes lift 50 on the vehicle 14 as the airflow 22 is diverted above and below the device 10 and ultimately presses in an upward direction on the wing 18 as the air 22 is flowing rearward simultaneously as the vehicle 14 travels in a forward direction.

Figure 2:
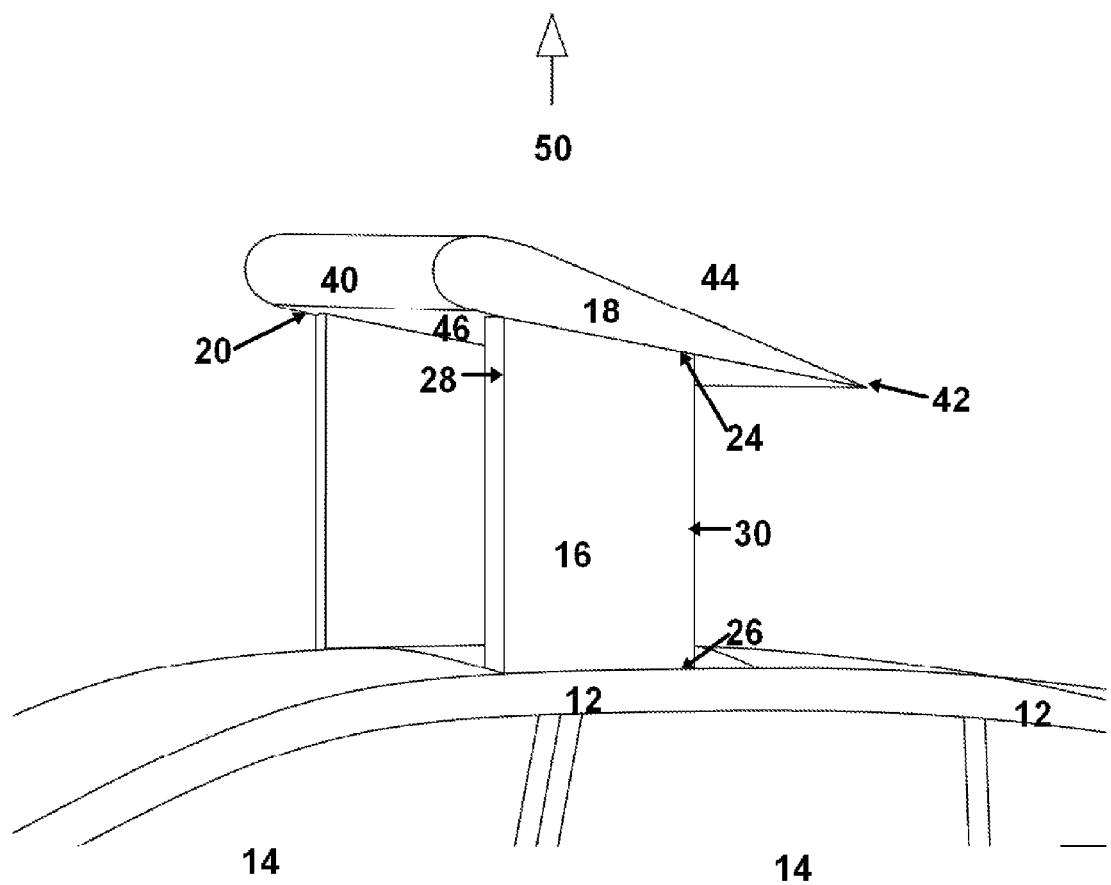
FIG. 2 depicts a close up side perspective view of the wing in place on the roof of the ground vehicle.

Turning to FIG. 2, a close up side perspective view of the wing 18 supported above the occupant roof 12 of a ground vehicle 14 by the side legs 16 is depicted. The side legs 16 are more easily visualized in this figure. Two side legs 16 are depicted, although other numbers of side legs could be contemplated for suspending the wing 18 above the occupant roof 12 of the vehicle 14. In the preferred embodiment, each side leg 16 has a top end 24 and a bottom end 26, the top end 24 being affixed to the underside 46 of the wing 18 and the bottom end 26 being secured or mounted to the roof 12 of the vehicle 14 (although the legs could be secured to other portions of the wing, such as the sides). Each side leg 16 further has an anterior edge 28 and a posterior edge 30, the anterior edge 28 being slighter longer from the top end to the bottom end than the posterior edge 30 such that when the wing 18 is affixed to the side legs 16 the leading edge 40 of the wing 18 is inclined higher than the trailing edge 42, creating a positive anterior angle. Other ways may be envisioned to tilt the wing to achieve the wing angle provided a positive anterior angle is achieved ranging from ten to eighteen degrees, with the preferred being twelve degrees.

The wing 18 as pictured, and in the preferred embodiment, is approximately the width of the ground vehicle 14. The purpose of the side legs 16 is to hold the wing 18 at a sufficient height above the occupant roof 12 of the ground vehicle 14 to achieve the desired lift 50 without adversely affecting handling and stability of the ground vehicle 14. In the prototype the wing 18 was supported two feet above the roof 12 of the ground vehicle 14 by the side legs 16 which were approximately two feet tall. The prototype was four feet wide (approximately the width of the car roof) and nineteen inches in length from the rounded leading edge to the tapered trailing edge.

In FIG. 2, the wing 18 shape is also visualized. The front or leading edge 40, of the wing 18 is rounded for improved aerodynamics and to direct the airflow above and below the wing 18. In the prototype, over the course of its approximate eighteen to twenty inches of length, the wing 18 decreases in its thickness from the thicker rounded leading edge 40 to the tapered pointed trailing edge 42. As a result, the topside 44 of the wing 18 may be planar or may have more of a convex shape traveling from the leading edge 40 to the trailing edge 42, while the underside 46 of the wing 18 is substantially planar. The overall configuration of the wing 18 resembles that of many traditional aircraft wings.

In the preferred embodiment, the slight height difference of the anterior edge versus the posterior edge of the side legs causes the wing to be supported at approximately a twelve degree vertical angle. Although a twelve degree angle of attack is the preferred embodiment, other angles are possible, although it is believed that at eighteen degrees and larger the benefit may be lost, as a stalling effect begins to occur. The wing essentially acts as an airfoil, increasing airflow velocity above its surface and decreasing airflow velocity below its surface creating the lift which in turn makes the vehicle lighter, concurrently reducing the energy (fuel) required to propel the vehicle.

The prototype wing model is nineteen inches long and approximately four and one-half inches thick at its maximum end (rounded leading edge) decreasing to under an inch at its tapered trailing edge. The shape is according to the standards of the National Advisory Committee of Aeronautics for wings. In prototype testing using computer simulation, the wing was placed on the roof of a standard size SUV, positioned twelve inches behind the front windshield and twenty-eight inches in height above the roof of the SUV. It is believed that positioning the wing where the underside of the wing is at a vertical distance ranging from twelve to thirty six inches above the occupant roof may be effective, depending upon the vehicle, speed and other variables.

The test results revealed the following with regard to comparison of the cases with and without the wing: Without the wing the Drag Force (Newton) was 3510.9241, the Lift Force (Newton) was 1824.8344, the Drag Coefficient was 0.455 and the Lift Coefficient was 0.236. With the wing, the Drag Force (Newton) was 3764.0954, the Lift Force (Newton) was 2265.0349, the Drag Coefficient was 0.465 and the Lift Coefficient was 0.280.

From the above calculations it can be determined that adding the wing slightly increases the drag force (7.21%). The lift force, however, is increased by 24.12%. Therefore adding the wing contributes a 2.2% increase to the aerodynamic drag coefficient, (a minor influence on vehicle performance), while causing an 18.6% increase to the aerodynamic lift coefficient, indicating a significant improvement to the fuel efficiency and vehicle performance.

The exact dimensions of the wing may vary when used for different vehicles. The key is to maintain essentially the same or similar proportions to those described in the prototype.

In tests, the most appreciable improvement in fuel efficiency occurred at speeds greater than 55 mph, although improvements are noted at other speeds as well. In an alternative embodiment, the wing may be extended much in the way that flaps are extended on an airplane wing. This feature will enable the maintenance of lift at lower speeds in addition to the lift already achieved at the higher speeds.

The envisioned construction material of the wing portion is fiberglass although other materials may prove effective as well, including wood, lightweight metals, rigid plastics, foams or other appropriate materials that would be lightweight yet durable enough to withstand wind. The legs may be constructed of the same material as the wing or a complementary material as described above.

Although in the prototype the wing is depicted as rigidly mounted to the ground vehicle via side legs that may be clamped in via brackets or anchored to the vehicle roof by any reasonable means, the disclosed device is also envisioned in an automated embodiment, or in a form that is releasable from the mounting. In an automated or even releasable embodiment, the wing would be capable of releasing or retracting into a low profile aerodynamic holder on the vehicle during periods of non-use, such as when parked in a garage. This would enable space saving. In such an automated embodiment, the driver would have controls in the vehicle for purposes of raising and lowering the wing as needed, or changing the wing's angle of attack, depending on the driving conditions. This may be further implemented by use of a computer chip within the vehicle's electronics that would sense driving conditions and respond with the correct wing response. The wing may incorporate extensions that would serve to improve fuel efficiency even at lower speeds.

The disclosed device may be incorporated into the vehicle roof at the time the vehicle is manufactured or may be later purchased and installed as a retrofit accessory.

Figure 3:
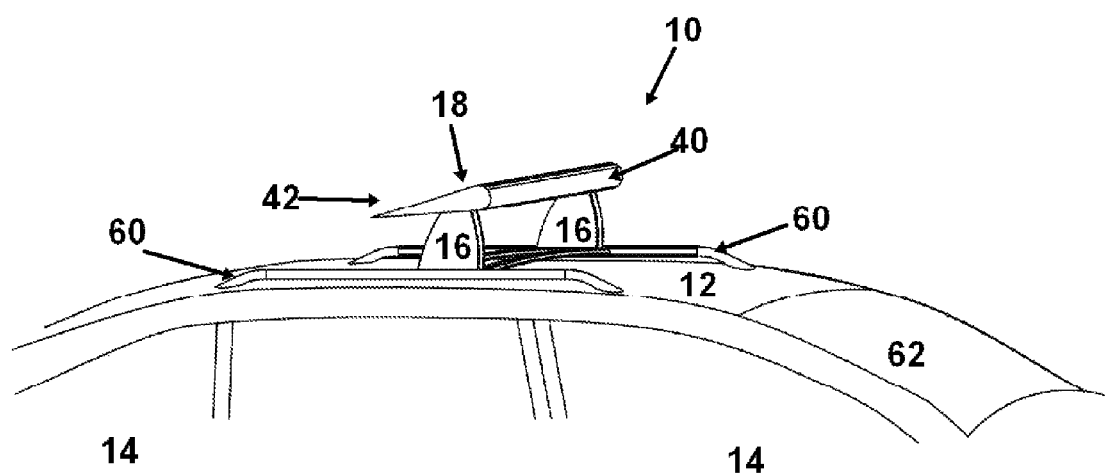
FIG. 3 depicts a side perspective of the wing atop a luggage or bicycle rack.

Turning to FIG. 3, the device 10 is pictured secured to an existing luggage or bicycle rack 60 that has been previously mounted or pre-manufactured to the roof 12 of the vehicle 14. This embodiment would enable an easy way for purchasers of the wing to mount it to their vehicle without having to actually drill holes or place brackets on the roof. In FIG. 3, the curved leading edge 40 of the wing 18 is pointed toward the front of the vehicle 14, the front windshield 62 of the vehicle visible in FIG. 3 for purposes of orientation.

In tests, using the prototype described above the inventor achieved increased fuel efficiencies of greater than 35%, while accounting for all other variables including wind speed and direction, path of travel and weight in vehicle.

The disclosed method and apparatus improves a ground vehicle's fuel efficiency safely, easily and inexpensively.

While the disclosed method and apparatus has been described in conjunction with the preferred embodiments thereof, many changes, modifications, alterations and variations will be apparent to those skilled in the art. The invention should therefore not be limited to the particular preferred embodiment disclosed but should include all embodiments that could fall within the scope of the claims.

Accordingly, the preferred embodiments of the invention shown in the drawings and described in detail above are intended to be illustrative, not limiting, and various changes may be made without departing from the spirit and scope of the invention as defined by the claims set forth below.

What is claimed is:

1. An aerodynamic device for increasing a ground vehicle's fuel efficiency, the device comprising:
   a wing supported above an occupant roof of a ground vehicle, the width of the wing spanning substantially the width of the occupant roof and further having a topside, an underside, a rounded leading edge and a tapered trailing edge, the thickness of the wing decreasing from the leading edge to the trailing edge;
   one or more legs supporting the wing, the one or more legs having a top end and a bottom end wherein the top end is secured to the wing and the bottom end is secured to the occupant roof, the one or more legs further having an anterior edge and a posterior edge, wherein
   the anterior edge is longer from the top end to the bottom end than the posterior edge, such that the rounded leading edge of the wing is vertically higher than the trailing edge of the wing, causing the wing to be angled downward.

2. The aerodynamic device of claim 1 wherein the wing position creates an anterior wing angle that is selected from a range consisting of ten to eighteen degrees.

3. The aerodynamic device of claim 1 wherein the wing position creates an anterior wing angle that is twelve degrees.

4. The aerodynamic device of claim 1 wherein a vertical distance between the occupant roof and the underside of the wing is selected from the range consisting of twelve inches to thirty-six inches.

5. The aerodynamic device of claim 1 wherein a vertical distance between the occupant roof and the underside of the wing is selected from the range consisting of eighteen inches to thirty inches.

6. The aerodynamic device of claim 1 wherein the bottom end of the one or more legs is secured to a luggage rack that is mounted to the occupant roof.

7. The aerodynamic device of claim 1 wherein the bottom end of the one or more legs is secured to a bicycle rack that is mounted to the occupant roof.

8. A method for increasing a ground vehicle's fuel efficiency, the method comprising the steps of:
   supporting a wing above an occupant roof of a ground vehicle, the width of the wing spanning substantially the width of the occupant roof and further having a topside, an underside, a rounded leading edge and a tapered trailing edge, the thickness of the wing decreasing from the leading edge to the trailing edge;
   supporting the wing with one or more legs, the one or more legs having a top end and a bottom end wherein the top end is secured to an underside of the wing and the bottom end is secured to the occupant roof, the one or more legs further having an anterior edge and a posterior edge, wherein the anterior edge is longer from the top end to the bottom end than the posterior edge, such that the rounded leading edge of the wing is vertically higher than the trailing edge of the wing, causing the wing to be angled downward.

9. The aerodynamic device of claim 8 wherein the wing position creates an anterior wing angle that is selected from a range consisting of ten to eighteen degrees.

10. The aerodynamic device of claim 8 wherein the wing position creates an anterior wing angle that is twelve degrees.

11. The aerodynamic device of claim 8 wherein a vertical distance between the occupant roof and the underside of the wing is selected from the range consisting of twelve inches to thirty-six inches.

12. The aerodynamic device of claim 8 wherein a vertical distance between the occupant roof and the underside of the wing is selected from the range consisting of eighteen inches to thirty inches.

13. The aerodynamic device of claim 8 wherein the bottom end of the one or more legs is secured to a luggage rack that is mounted to the occupant roof.

14. The aerodynamic device of claim 8 wherein the bottom end of the one or more legs is secured to a bicycle rack that is mounted to the occupant roof.

* * * * *